US008849688B2

(12) United States Patent
Cash, Jr. et al.

(10) Patent No.: US 8,849,688 B2
(45) Date of Patent: Sep. 30, 2014

(54) SYSTEM FOR ASSIGNMENT ROUTING, DELEGATION AND REASSIGNMENT

(75) Inventors: Leon H. Cash, Jr., Durham, NC (US); Christopher J. Dawson, Arlington, VA (US); Richard V. Hom, Troy, MI (US)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 13/540,099

(22) Filed: Jul. 2, 2012

(65) Prior Publication Data

US 2014/0006076 A1 Jan. 2, 2014

(51) Int. Cl.
*G06Q 10/00* (2012.01)
(52) U.S. Cl.
USPC ........................................... 705/7.14
(58) Field of Classification Search
USPC ..................... 705/7.13, 7.14, 7.16
See application file for complete search history.

(56) References Cited

U.S. PATENT DOCUMENTS

| | | | | |
|---|---|---|---|---|
| 8,065,175 | B1 * | 11/2011 | Lewis | 705/7.19 |
| 8,112,299 | B2 * | 2/2012 | Kim et al. | 705/7.18 |
| 8,185,426 | B1 * | 5/2012 | Khoubyari | 705/7.19 |
| 2008/0167937 | A1 * | 7/2008 | Coughlin et al. | 705/9 |
| 2009/0063242 | A1 * | 3/2009 | Shaouy | 705/9 |
| 2010/0306019 | A1 * | 12/2010 | Mandava | 705/9 |
| 2011/0015963 | A1 * | 1/2011 | Chafle et al. | 705/9 |

OTHER PUBLICATIONS

Sacco, Al, Review: TeleNav Track Uses GPS to Manage Your Mobile Workforce, Jun. 10, 2007, http://www.cio.com/article/118351/Review_TeleNav_Track_Uses_GPS_to_Manage_Your_Mobile_Workforce?page=&taxonomyId=3063.*
SmarTask Project Assignment, Instituto SUperior Tecnico, Mar. 2010, https://fenix.tecnico.ulisboa.pt/downloadFile/3779573942217/cmov-project.pdf.*

* cited by examiner

*Primary Examiner* — Beth V Boswell
*Assistant Examiner* — Jeffrey Zimmerman
(74) *Attorney, Agent, or Firm* — Isaac J. Gooshaw; John Pivnichny (57) ABSTRACT

A computer identifies an available task assignment, which is location independent for completion, and determines if an assignee is available to perform work on the task assignment. The assignee's availability is based in part on information received from a mobile device of the assignee. When a change in availability is determined by the mobile device, the mobile device sends the assignee's availability information to the computer, indicating the change. If the computer determines that the assignee is available, then the computer sends the task assignment information to the mobile device of the assignee. If the computer determines the assignee is not available, then the computer sends the task assignment information to a delegate of the assignee. The computer monitors the completion of a task assignment. If the computer determines that a task assignment has not, or can not, be timely completed, then the task assignment is reassigned to a delegate.

20 Claims, 4 Drawing Sheets

SYSTEM FOR ASSIGNMENT ROUTING, DELEGATION AND REASSIGNMENT

FIELD OF INVENTION

The present invention relates generally to computer routing of task assignments to a mobile assignee, and more particularly to the automatic sending or delegation of a task assignment.

BACKGROUND OF THE INVENTION

Business process execution is often performed in workflow fashion, by routing a work product through a list of tasks assigned to resources. A typical example involves the fulfillment of a sales order, in which the order is placed, and then routed for the ordered product(s) to be pulled from inventory, followed by billing, shipping, and so forth. In a typical business, each of these activities is handled by a separate resource or group of resources, and the activities are primarily performed serially, since the initiation of one activity or task is usually dependent upon the successful completion of its immediate predecessor.

Existing enterprise workforce management solutions can handle the routing of such workflows. For example, if a computer network at an enterprise has become disabled, the enterprise manager may need a technician immediately. The enterprise manager telephones a customer service desk and the service desk operator uses an off-the-shelf workforce management solution to determine and confirm the availability of a suitable technician. The suitability of the technician can be determined based on the proximity of the technician to the disabled network or other criteria known in the art. The technician's schedule is updated on a server and the technician is sent a new work request with details about the computer network problem.

In many cases, the widespread availability and adoption of handheld or other portable computing devices, such as smartphones, has enabled mobile employees to perform some workflow tasks while in transit between locations or at any of a variety of locations which need not be specified. For example, an account manager can review and approve a contract, or a purchasing manager can approve a purchase order, while riding on a train using a smartphone. As the completion of these tasks is often highly time-dependent, the ability to execute them remotely and while on the move provides substantial benefits to a business. However, there are dangers inherent in allowing mobile employees to perform workflow tasks while in transit. For example, if a mobile employee is distracted by a workflow task on his or her smartphone while driving a car, the risk increases that the employee will be injured in a car accident and that his or her employer will be exposed to vicarious liability.

SUMMARY OF THE INVENTION

Embodiments of the present invention provide a system, method, and program product for task assignment routing, delegation and re-assignment of tasks. A computer identifies an available task assignment, wherein the task assignment does not require an assignee to be at a specified location to complete the task assignment, and determines if an assignee is available to perform work on the task assignment. The assignee's availability is based in part on information received from a mobile device of the assignee. When a change in availability is determined by the mobile device, the mobile device sends the assignee's availability information to the computer, indicating the change. If the computer determines that the assignee is available, then the computer sends the task assignment information to the mobile device of the assignee. If the computer determines the assignee is not available, then the computer sends the task assignment information to a delegate of the assignee. In certain embodiments, an assignee or a delegate of the assignee is determined to be unavailable if the availability information is not timely received by the computer, or if the respective mobile device fails to timely respond to a signal.

In certain embodiments of the invention, the computer monitors the timely completion of a task assignment. If the computer determines that a task assignment has not been, or can not be, timely completed, then the task assignment is reassigned to a delegate of the assignee. In certain embodiments, the computer identifies a delegate of the assignee from a plurality of potential delegates based in part on the availability of the delegate. In other embodiments of the invention, identification of an assignee or delegate of the assignee includes a determination of task assignment appropriateness for the potential assignee or the delegate of the assignee.

DETAILED DESCRIPTION OF THE INVENTION

Embodiments of the present invention will now be described in detail with reference to the accompanying drawings. The following is intended to provide a detailed description of various embodiments of the present invention, as examples of the invention, and should not be taken to be exhaustive nor limit the invention to the precise forms disclosed. Many modifications and variations are possible. Such modifications and variations that may be apparent to a person skilled in the art of the invention are intended to be included within the scope of the invention as defined by the accompanying claims that follow the description.

Figure 1:
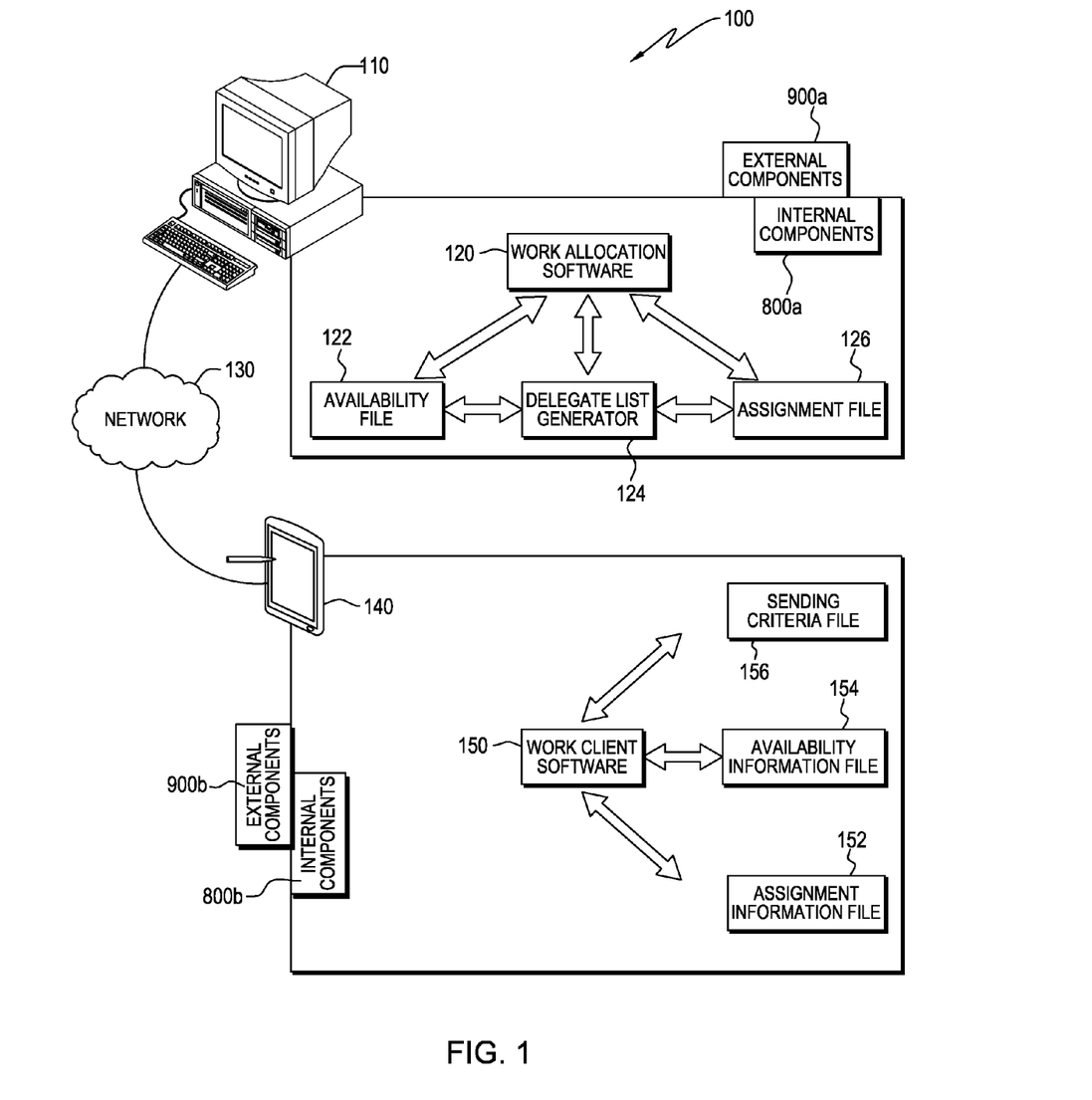
FIG. 1 is a block diagram of task assignment distribution system 100 in accordance with an embodiment of the present invention.

FIG. 1 is a functional block diagram illustrating task assignment distribution system 100 in accordance with one embodiment of the present invention. Assignment distribution system 100 includes computer 110, and one or more portable personal computing devices 140, all interconnected over network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computer 110 and personal computing device 140 in accordance with a desired embodiment of the present invention.

In various embodiments of the present invention, computer 110 can be a server, a laptop computer, a tablet computer, a netbook computer, a personal computer (PC), or a desktop computer. In another embodiment, computer 110 represents a computing system utilizing clustered computers and components to act as a single pool of seamless resources when accessed through network 130, e.g., represents a datacenter for a cloud computing application. In general, computer 110 can be any computing device or a combination of devices capable of communication with network 130 and running work allocation software 120. Computer 110 may include internal hardware components 800a and external hardware components 900a, as depicted and described in further detail with respect to FIG. 4. Computer 110 includes work allocation software 120 which has access to assignment file 126 and availability file 122, and which works cooperatively with delegate list generator 124. Assignment file 126 and availability file 122 can include task assignments and availability information, respectively, which when transmitted between computer 110 and personal computing device 140 may be referred to herein as a first information and as a second information, further respectively.

Work allocation software 120 uses information stored on files 122 and 126 and received from personal computing device 140 to determine an available assignee for receipt of a task assignment. If work allocation software 120 determines that the assignee is not available, then it will automatically delegate the task assignment. In the case that work allocation software 120 determines that the task assignment is not, or can not be, completed in a timely manner it will reassign the task assignment to a delegate. The task assignment information is then sent by work allocation software 120 to another applicable recipient.

In this embodiment of the invention, the task assignment information stored in assignment file 126 includes a description of the task assignment, a status as complete or not complete, a file containing information needed by an assignee or delegate to complete the task assignment, a time requirement for task assignment completion, a list of preferred assignee and delegate characteristics as well as a list of preferences associated with the task assignment. In other embodiments of the invention the information stored in assignment file 126 can vary in content.

Work allocation software 120 has access to availability file 122 which stores the availability information associated with assignees and delegates. Availability file 122 includes information received from one or more personal computing devices 140 as well as updatable task assignment queues for the assignees and delegates. Availability file 122 is used by delegate list generator 124 to determine an assignee and delegate list for a task assignment. The update of availability file 122 can be requested by work allocation software 120 or can be initiated by the receipt of new availability information from personal computing device 140. The types of information stored in availability file 122 can vary in other embodiments of the invention.

In this embodiment of the invention, delegate list generator 124 contains a list of all possible assignees and delegates along with files containing characteristics and preferences for each assignee and delegate. For example, the list of all possible assignees and delegates can include all of the employees of a particular company, or all of the executives and their assistants within a department of a company as well as a priority associated with the particular employee. For example, it may be improper to send an invoice to the CEO of a company if there were eight other employees lower in the chain of command who would be able to handle the invoice. By linking the priority to an employee and matching it to the task assignment the task assignment is more likely to be handled by the appropriate personnel in the chain of command. The information contained in delegate list generator 124 can vary in other embodiments of the invention and may be stored in alternative locations.

Delegate list generator 124 identifies an assignee and a list of delegates for the assignee by utilizing lists of characteristics and preferences associated with the assignee and delegates, comparing them with those of the task assignment. The characteristics and preferences can include the skill set, security clearance, license, authorization and authority, date constraint, time constraint, task assignment queue and personal task assignment preferences. The information used to select the assignee and delegates is contained in delegate list generator 124 and availability file 122, and is correlated and compared with the task assignment information stored on assignment file 126. The assignee and delegates are then selected on the basis of a best match with the task assignment. For example, delegate list generator 124 might select, for a particular task assignment requiring a specific security clearance, one assignee and three delegates who all have the specific security clearance. In another example, delegate list generator 124 might select, for a particular task assignment requiring a specific skill set, one assignee and six delegates who all have the required skill set. A skill set may include, for instance, an ability to perform a repair, a competency to perform a negotiation, a fluency in a computer or spoken language, or another skill set. In a further example delegate list generator 124 might select the assignee and delegates from only those assignees and delegates that have indicated a preference for that particular type of task assignment. In yet another example, delegate list generator 124 might select, for a time sensitive task assignment requiring a signature, one assignee and one delegate who each have the proper authority to sign and who each have a minimal number of task assignments in his or her respective task assignment queue. The process of assignee and delegate selection can vary in other embodiments of the invention.

In this embodiment of the invention, personal computing device 140 can be a laptop computer, a tablet computer, a netbook computer, personal computer (PC), a desktop computer, a personal digital assistant (PDA), a smart phone, or any programmable electronic device, or a combination of devices, capable of communicating with network 130 and running work client software 150. Personal computing device 140 may contain internal hardware components 800b and external hardware components 900b, as depicted and described in further detail with respect to FIG. 4.

Personal computing device 140 includes work client software 150 which has access to availability task assignment information file 152, availability information file 154, and sending criteria file 156.

Availability information file 154 comprises information pertinent to the determination, made by work allocation software 120 of computer 110, of availability of the assignee associated with personal computing device 140. This information includes the velocity and direction of personal computing device 140, location of personal computing device 140, calendar date stored on personal computing device 140, scheduled events in the calendar of personal computing device 140, time of day of the assignee according to personal computing device 140, number of task assignments in task assignment information file 152, and the connectivity of personal computing device 140 with computer 110 and network 130. The categories of availability information stored in availability information file 154 can vary in other embodiments of the invention.

Assignment information file 152 is the storage location for the task assignment information received from computer 110.

Assignment information file 152 contains all the required information for an assignee to complete a given task assignment. As task assignments are received they are placed into a task assignment queue located in task assignment information file 152. The queue can have a different location, such as in another file or may not exist at all in certain embodiments of the invention.

In this embodiment of the invention, work client software 150 accesses sending criteria file 156, which contains all of the criteria that are used by work client software 150 to determine if the information stored in availability information file 154 needs to be sent to computer 110. The criteria for sending the information includes scheduled or periodic sending, receipt of a sending request, request by the assignee associated with the personal computing device 140, and one or more thresholds that, if violated, initiate a sending of the information to computer 110. The sending thresholds include the velocity and direction of personal computing device 140, the location of personal computing device 140, the time to complete a given task assignment, the connectivity between personal computing device 140 and computer 110 for a period of time, and the presence or lack of interaction between the assignee and personal computing device 140. The sending criteria can be developed from or evaluated against the many available functions of personal computing device 140 which exist to monitor the state of personal computing device 140 and the availability of its user. For example, in an embodiment in which personal computing device 140 is a smartphone, personal computing device 140 may thus include motion sensing features and mapping features that allow work client software 150 to monitor the velocity, direction and location of personal computing device 140. Many such smartphones also include calendar and appointment functions, which can also be used to allow work client software 150 to monitor the availability of the assignee. Other embodiments of the invention may include different sending criteria and contain a variety of different sending thresholds. Further examples are discussed in greater detail below in relation to FIG. 3, at step 314.

Figure 2:
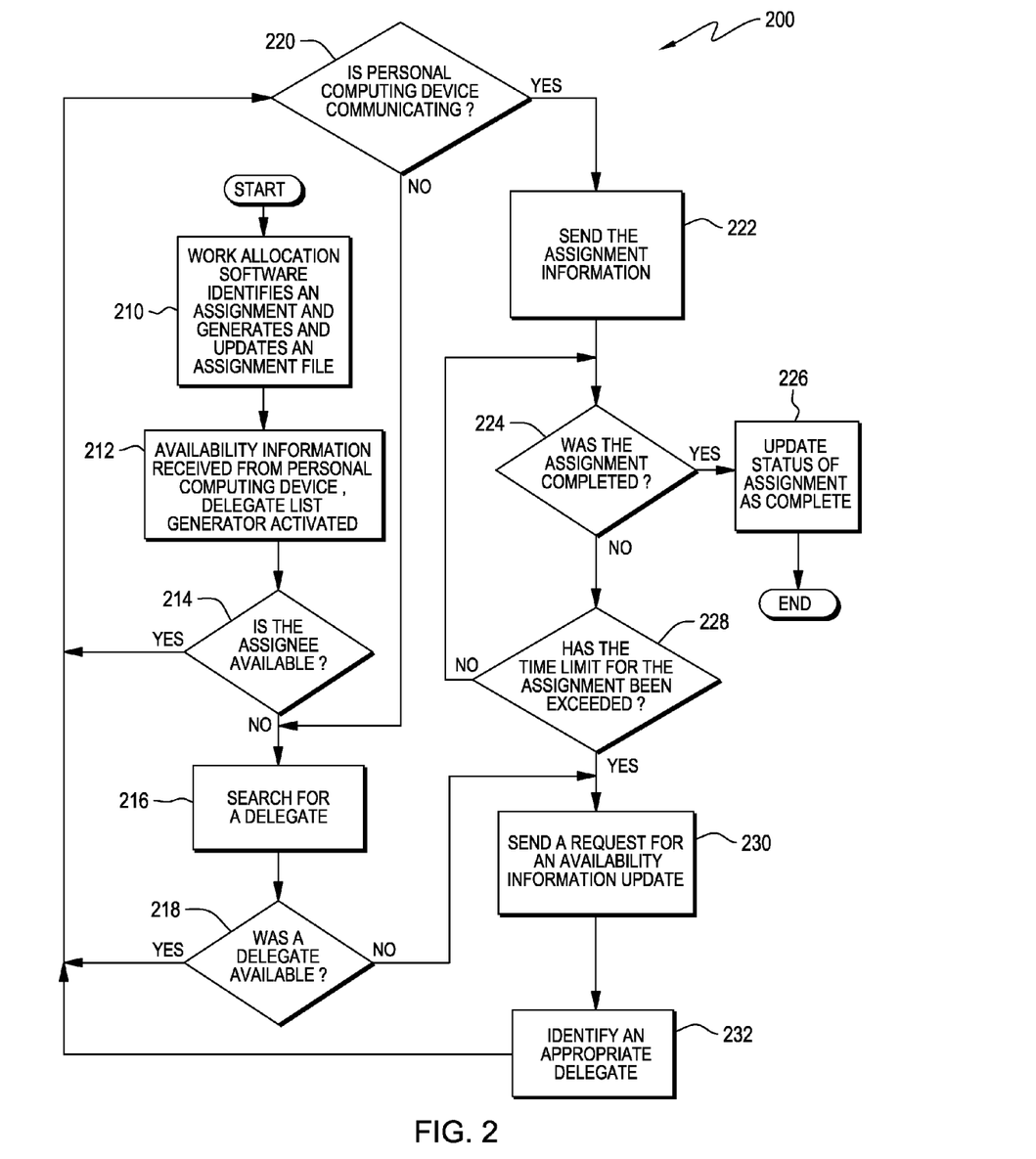
FIG. 2 is a flowchart illustrating the steps of a work allocation software of FIG. 1 in accordance with an embodiment of the present invention.

FIG. 2 is a flowchart 200 illustrating the steps that work allocation software 120, running on computer 110, takes for work delegation, work task assignment and work re-assignment, in accordance with an embodiment of the present invention.

In this embodiment of the invention, work allocation software 120 monitors incoming signals from all personal computing devices 140. Updates to files 122 and 126, and information stored in delegate list generator 124, are made accordingly as information and files are received and identified by computer 110. These updates are applied to availability file 122, delegate list generator 124, and assignment file 126. Other embodiments of the invention may include features to update the software of work allocation software 120, availability file 122, delegate list generator 124, and assignment file 126.

Work allocation software 120 identifies an available task assignment, in step 210, followed by the generation of a task assignment information file for the task assignment and an update of assignment file 126, by work allocation software 120, with the appropriate information corresponding to the task assignment information. In other embodiments of the invention, the step of updating the assignment file 126, by work allocation software 120, need not follow the identification of the task assignment.

Assignment file 126 includes all the information needed for the completion of the task assignment and the time constraints associated with the task assignment. In other embodiments of the invention, the generation of the task assignment information can occur at a different point and include different information.

During step 210, work allocation software 120 may send a request for an availability information update to one or more personal computing devices 140. In other embodiments of the invention, the sending of a request for an availability information update can occur at another point.

In this embodiment of the invention, in step 212, personal computing device 140 responds to the request for availability information by sending the pertinent information stored in availability information file 154, which computer 110 receives. The failure of personal computing device 140 to respond to the request for availability information results in the determination, by work allocation software 120, that the assignee or delegate associated with the un-responding personal computing device 140 is unavailable. In other embodiments of the invention, the failure of personal computing device 140 to respond to the request for availability information does not result in the automatic determination that the assignee or delegate is unavailable, in step 214.

In step 212, work allocation software 120 may also update availability file 122 in correlation to receipt of, or failure to timely receive, availability information. In other embodiments of the invention, updates to availability file 122 can be initiated by other parameters.

Work allocation software 120 activates the delegate list generator 124 after availability file 122 has been updated, in step 212. The time of activation of delegate list generator 124 can vary in other embodiments of the invention. The activation of delegate list generator 124 results in the generation of a preferred assignee as well as a list of appropriate delegates.

The availability of the assignee is determined, in step 214, by work allocation software 120 checking both the content and reception time of the last update to availability file 122. If the assignee is determined to be available, then work allocation software 120 initiates a communication check, in step 220, by sending a communications test signal to personal computing device 140. If personal computing device 140 responds by indicating an acceptable communication level, then in step 222, work allocation software 120 sends the relevant task assignment information, stored in assignment file 126, to the assignee's personal computing device 140. The sending of task assignment information to an assignee results in an update to the relevant task assignment queue of availability file 122. In an example of the above process, computer 110 receives availability information that indicates an assignee is available to receive a task assignment. After confirming sufficient communication, between personal computing device 140 and computer 110, the task assignment is sent to the assignee. In other embodiments of the invention if an availability information update is determined to be untimely, then an attempt to update the availability information may be made before the determination of assignee availability.

In this embodiment of the invention, in step 220, if personal computing device 140 does not respond accordingly or in a timely fashion to the communications check signal, then work allocation software 120 initiates the delegation process of step 216 to search for a delegate. For example, computer 110 receives availability information indicating an assignee is available to receive a task assignment. However, when work allocation software 120 performs the communication check, it determines that there is insufficient connectivity to send the task assignment. So, work allocation software 120 initiates a search for and identifies an available delegate, followed by a communication check. After confirming sufficient communication, the task assignment information is sent to the delegate. In other embodiments of the invention, multiple attempts can be made to confirm communication between computer 110 and the assignee's personal computing device 140, before a delegation process commences.

If the assignee is determined to be unavailable in step 214, then in step 216, work allocation software 120 searches the lists generated by delegate list generator 124 for an appropriate delegate. If a delegate is found then a determination of his or her availability is made, within step 216, by checking the content and reception time of the last update of availability file 122. In step 218, if the delegate is determined to be available, then work allocation software 120 initiates a communication check in step 220 by sending a communications test signal to personal computing device 140. If personal computing device 140 responds accordingly, then in step 222, work allocation software 120 sends the necessary information stored on assignment file 126 to the delegate's personal computing device 140. As an example of the above process, computer 110 receives availability information that indicates an assignee is not available to receive a task assignment. So, work allocation software 120 initiates a search for and identifies an available delegate, followed by a communication check between computer 110 and the identified delegate's personal computing device 140. After work allocation software 120 confirms sufficient communication, the task assignment information is sent to the delegate. The sending of task assignment information to a delegate results in an update to availability file 122, namely an update to the relevant task assignment queue.

However, if the delegate's personal computing device fails to respond accordingly or in a timely fashion with the communications check signal sent by work allocation software 120 in step 220, then work allocation software 120 initiates a search for another delegate from the list provided by delegate list generator 124. If in step 218 the delegate list is determined to be empty or to contain no available delegates, then work allocation software 120 responds by sending a request for an availability information update to all appropriate delegates in step 230. In some embodiments of the invention, if no delegate can be determined after the availability information update, then work allocation software 120 updates the file of the task assignment, located in assignment file 126, with a status indicating that it is unassigned. In an example of the above process, work allocation software 120 searches for another available delegate, but this time, none was found. As a result, work allocation software 120 sends a request to all personal computing devices for an availability information update. An available delegate is identified based on the replies to the request and, after confirming sufficient communication, the task assignment is sent to that delegate. In another example, again no assignee was available or delegate was found to receive the task assignment. Work allocation software 120 sends a request to all personal computing devices for an availability information update. However, this time, no available delegate is identified based on the replies to the request. As a result, the assignment file 126 is updated to reflect the task assignment status as unassigned. Alternatively, in other embodiments of the invention, the failure to initially locate an assignee or delegate can result in multiple requests for and subsequent updates of the availability files, stored in availability file 122, before further attempts are made to assign the task assignment.

In some embodiments of the invention, in step 222 the sending of the task assignment information by work allocation software 120 to an assignee or delegate initiates a sequence of communications between computer 110 and the relevant personal computing device 140 to confirm the reception of the task assignment information. This function is not present in all embodiments of the invention.

In step 224, work allocation software 120 determines whether the task assignment was completed. If work allocation software 120 receives a signal from personal computing device 140 that a task assignment has been completed, then work allocation software 120 updates the files associated with the task assignment in step 226. For example, the file located in assignment file 126 that is associated with the task assignment receives a status indicating that the task assignment has been completed. The receipt of a task assignment completion signal or an update to assignment file 126 need not occur in all embodiments of the invention.

However, if no signal is received that the task assignment is completed, in step 224, then in step 228, work allocation software 120 determines if the time limit to complete the task assignment has been exceeded. If the time limit has not been exceeded, then work allocation software 120 continues to monitor the completion status and the time limit for the task assignment in steps 224 and 228 respectively. There may not be time limits associated with all task assignments or time limits used in all embodiments of the invention.

If the task assignment time limit has been exceeded, then work allocation software 120 sends a signal to personal computing device 140 that contains the task assignment, to remove the task assignment from the task assignment queue located in task assignment information file 152. Work allocation software 120 also sends an availability file update request to all appropriate personal computing devices, in step 230, and a subsequent re-assignment of the task assignment to an appropriate available delegate, in step 232. In some embodiments of the invention, the failure to timely complete a task assignment may not result in either its removal from the task assignment queue or a re-assignment of the task assignment.

Figure 3:
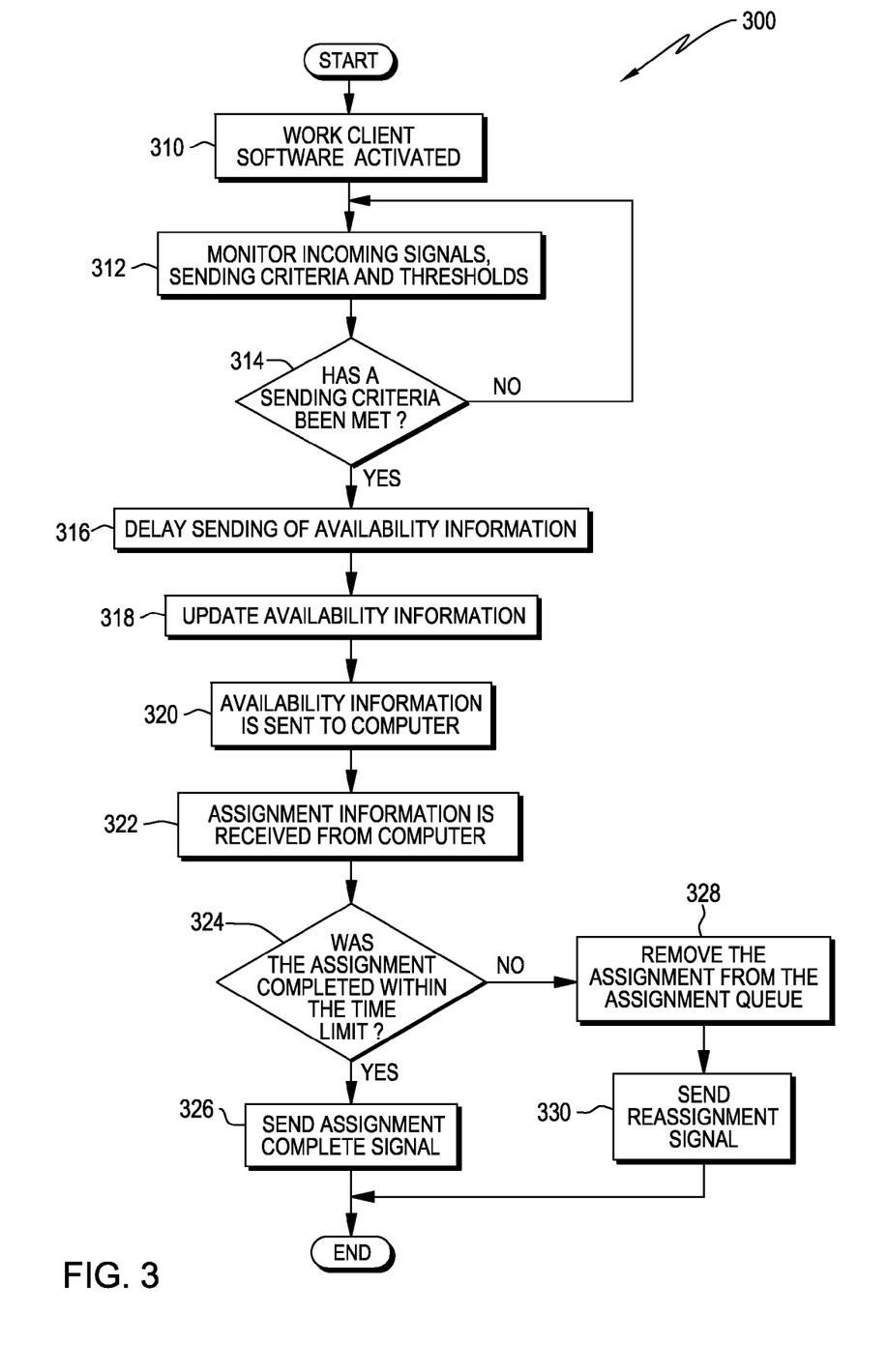
FIG. 3 is a flowchart illustrating the steps of a work client software of FIG. 1 in accordance with an embodiment of the present invention.

FIG. 3 is a flowchart 300 illustrating work client software 150 running on personal computing device 140. In an embodiment of the invention, work client software 150 gathers availability information for the assignee associated with personal computing device 140 and saves it in availability file 154. The assignee associated with personal computing device 140 is a potential recipient of a task assignment. Work client software 150 sends the availability information for the associated assignee to computer 110. The sent availability information is used by work allocation software 120 to determine a recipient of a task assignment, as discussed above. When an assignee is determined to be the recipient of the task assignment, then the task assignment information is sent from computer 110 to the assignee's personal computing device 140.

In this embodiment of the invention, work client software 150 is activated by the assignee of personal computing device 140, in step 310 of FIG. 3. The activation initiates a monitoring of incoming signals by work client software 150. If prompted by an appropriate communications check signal, such as that sent by computer 110 in step 220 of FIG. 2, then work client software 150 will send a corresponding reply to indicate communications status. In this embodiment, once activated, work client software 150 monitors for signals indicating a request for a first information update. If a request for an availability information update is identified, then work client software 150 will reply by transmitting the necessary information, found in availability information file 154, to computer 110. Activation of work client software 150 initiates a monitoring of the availability sending criteria governed by sending criteria file 156, in step 312. In other embodiments of the invention, the monitoring of the availability sending criteria, the initiation of signal monitoring, and the replying to signals can become activated at different points.

Work client software 150 sends the availability information to computer 110 once a sending criteria has been met in step 314. The sending criteria include a scheduled sending of availability information, a request for the availability information, a user request by the assignee associated with personal computing device 140, and a violation of a sending threshold. For example, if the sending criteria includes a velocity limit with a duration requirement, and an assignee with personal computing device 140 is in a moving vehicle that exceeds that velocity limit for a period longer than the duration requirement, then work client software 150 sends the corresponding information stored in availability information file 154 to computer 110. In another example, if an assignee is driving a car and exceeds the velocity and duration criteria, and work client software 150 prompts the assignee to indicate his or her availability, then if the assignee fails to interact with personal computing device 140 because he or she is driving, work client software 150 determines the assignee is unavailable and sends that information to computer 110.

In another example, the assignee is in a meeting with a manager located in the home office building. Using the information provided by sensors of personal computing device 140, work client software 150 identifies the location of the assignee and the scheduled meeting in the calendar of personal computing device 140, and determines the assignee is therefore unavailable. In a further example, work client software 150 determines that the velocity and duration thresholds have been exceeded and that a sending criteria has been met. However, using information provided by sensors and mapping software of personal computing device 140, work client software 150 identifies the location and direction of travel of the assignee as corresponding to a train track. If the assignee is travelling by train, he or she may still be able to perform a task assignment. Work client software 150 thus updates and sends the information stored in availability information file 154 to computer 110, indicating the assignee is in transit and may be available.

In another example, personal computing device 140 experiences intermittent loss of signal with network 130 in excess of a connectivity criteria, and in response work client software 150 sends the information stored in availability information file 154 to computer 110, indicating the assignee is unavailable. In a further example, the assignee requests a sending of availability information including an estimate of time necessary to complete all the task assignments in the assignee's task assignment queue. In a continuation of the previous example, one of the criteria for determining the appropriateness of an assignee includes comparing the assignee's remaining scheduled work hours to the estimate of time necessary to complete all the task assignments in the assignee's task assignment queue taking into account the estimated time it would take to complete a new task assignment. If there is insufficient time remaining in the assignee's scheduled work hours to accommodate the new task assignment, then the task assignment is delegated. A similar approach can be used to reassign work already listed in the assignee's task assignment queue. If there is insufficient time remaining in the assignee's scheduled work hours to complete a give task assignment, then the task assignment is reassigned to a delegate. Sending criteria may vary in other embodiments of the invention.

In other embodiments of the invention, personal computing device 140 may gather availability information from other devices. For example, personal computing device 140 connects to and gathers velocity information from the computer system of a car that the assignee is driving. If work client software 150 determines that the velocity and duration thresholds have been exceeded and that a sending criteria has been met, then work client software 150 updates and sends the information stored in availability information file 154 to computer 110, indicating the assignee is unavailable. The gathering of availability information from other devices may not be present in all embodiments of the invention.

In this embodiment of the invention, work client software 150 will delay the sending of the availability information, in step 316, if a sending threshold is exceeded and a sending criteria is met in steps 312 and 314, respectively. This delay allows the assignee associated with personal computing device 140 an opportunity to indicate the status of his or her availability providing a means for an assignee to continue to receive task assignments when a sending threshold is exceeded and a sending criteria has been met. If the assignee does not interact with work client software 150 during the delay period of step 316 to indicate that they are available, then the availability information is updated in step 318 to indicate that the assignee is unavailable to receive task assignments. The updated availability information is then sent to computer 110 in step 320. The delay of availability information sending and opportunity to indicate assignee availability may not be present in all embodiments of the invention.

In this embodiment, if in step 314, a sending threshold is being violated in excess of a time limit, then in step 318 work client software 150 will update availability file 154, to indicate that the assignee is unavailable to receive a task assignment. The updated availability information will then be sent to computer 110 in step 320. In other embodiments of the invention the criteria threshold need only be exceeded, excluding the duration of time aspect.

Work client software 150 will perform a final update to availability file 154, in step 318, before sending it to computer 110, in step 320. In some embodiments of the invention the assignee can interact with work client software 150 and cancel or delay the sending of the availability information.

If work client software 150 determines that a sending criteria is no longer being violated and that the assignee's status has changed to available, then work client software 150 will update availability file 154 in step 318, to indicate that the assignee is available to receive a task assignment. The updated availability information will then be sent to computer 110 in step 320. The sending of an updated availability information to computer 110, after a determination that the assignee's status has changed to available, may not be present or follow the same steps in all embodiments of the invention.

In this embodiment of the invention, work client software 150 receives task assignment information, in step 322, from computer 110 in response to an indication that the assignee is available to receive a task assignment. The availability to receive the task assignment is partly based on the number of task assignments in the task assignment queue of the assignee. If the queue of the assignee is full then work client software 150 updates availability information file 154 with a status indicating that the assignee is unavailable. In some embodiments of the invention there is no queue limit to the number of task assignments an assignee may have. In some embodiments of the invention, the queue information is included as part of the task assignment information file 152.

In some embodiments of the invention, when work client software 150 receives the task assignment information, it determines if the task assignment information is complete and intact. Work client software 150 then sends a signal to computer 110 indicating the status of receiving the task assignment information during step 322. A failure to receive a complete and intact task assignment information file can trigger a resending of the task assignment information by computer 110. The sending of a signal indicating reception of the task assignment information can also be initiated by a request from computer 110. The steps, and corresponding signaling, confirming reception of task assignment information is not present in all embodiments of the invention.

Work client software 150 monitors the task assignments in the task assignment queue for any time limit constraints associated with task assignments, in step 324. If a task assignment has not been completed within the time allowed, then work client software 150 removes the task assignment from the task assignment queue, in step 328 and sends a signal to computer 110 indicating the task assignment requires re-assignment, in step 330. In some embodiments of the invention the assignee can initiate the removal of a task assignment from the task assignment queue and the sending of a signal for a task assignment to be reassigned.

Once a task assignment is completed, work client software 150 sends a task assignment status signal to computer 110 indicating that the particular task assignment is complete, step 326. The work client software 150 then updates task assignment information file 152, opening up a slot in the task assignment queue. These steps need not happen in all embodiments of the invention.

Figure 4:
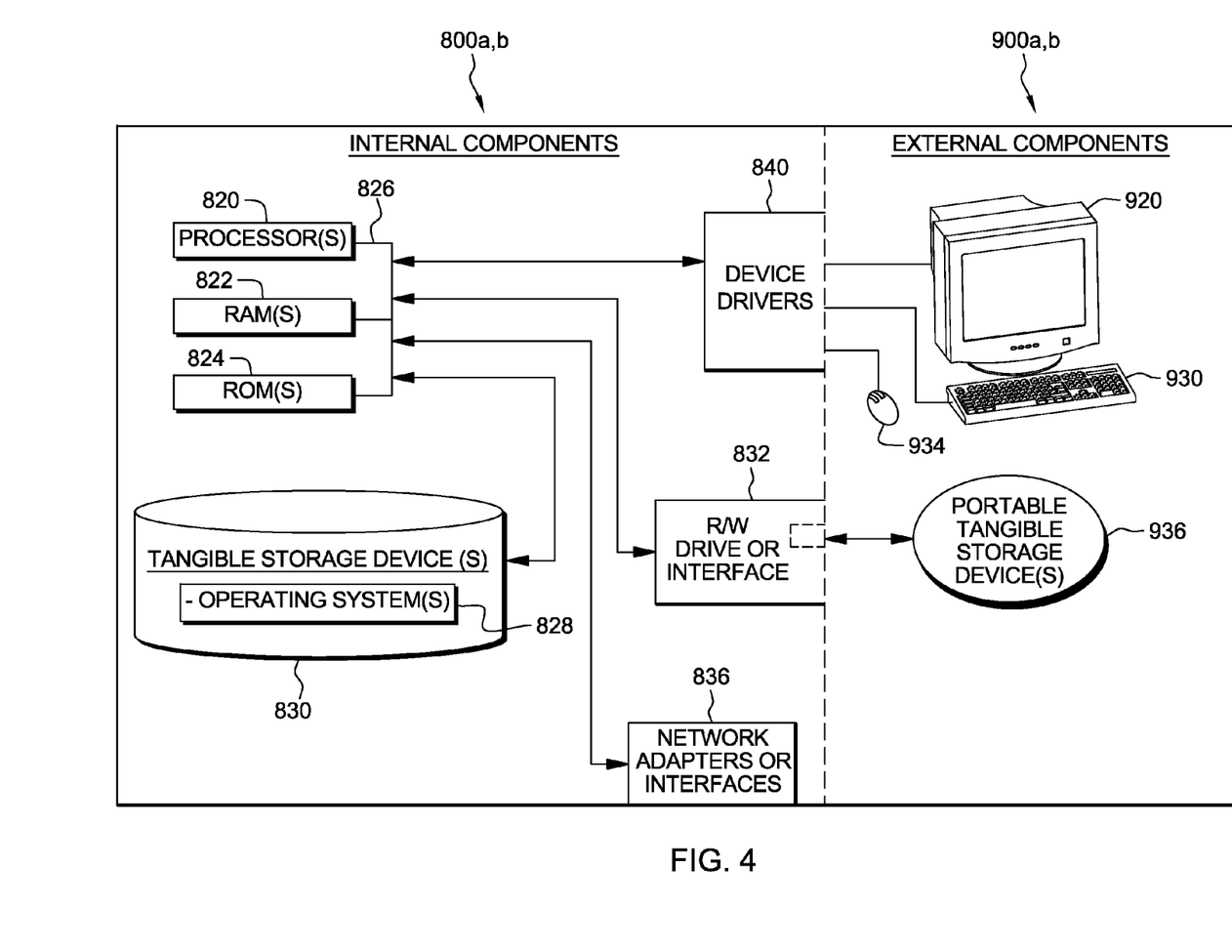
FIG. 4 is a block diagram of internal and external components within the computing devices of FIG. 1 in accordance with an embodiment of the present invention.

FIG. 4 shows a block diagram of respective internal and external components 800a, b and 900a, b of a data processing system such as computer 110 or personal computing device 140, as seen in FIG. 1, in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800a, b and 900a, b is representative of any electronic device capable of executing machine-readable program instructions. Data processing system 800a, b and 900a, b may be representative of a smart phone, a computer system, PDA, or other electronic devices. Examples of computing systems, environments, and/or configurations that may represented by data processing system 800a, b and 900a, b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computer 110, and personal computing device 140 include respective sets of internal components 800a, b and external components 900a, b illustrated in FIG. 4. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems, work allocation software 120 in computer 110, and work client software 150 in personal computing device 140, are stored on one or more of the respective computer-readable tangible storage devices 830 for execution or access by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Work allocation software 120 in computer 110, and work client software 150 in personal computing device 140, can be stored on one or more of the respective portable computer-readable tangible storage devices 936, read via the respective R/W drive or interface 832 and loaded into the respective hard drive 830.

Each set of internal components 800a, b also includes network adapters or interfaces 836 such as a TCP/IP adapter cards, wireless wi-fi interface cards, or 3G or 4G wireless interface cards or other wired or wireless communication links. Work allocation software 120 in computer 110, and work client software 150 in personal computing device 140, can be downloaded to computer 110 or personal computing device 140 respectively, from an external computer via a network (for example, the Internet, a local area network or other, wide area network) and respective network adapters or interfaces 836. From the network adapters or interfaces 836, work allocation software 120 in computer 110, and work client software 150 in personal computing device 140, are loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

One of the preferred implementations of the invention is an application, namely, a set of instructions (program code) in a code module which may, for example, be resident in the random access memory of the computer. Until required by the computer, the set of instructions may be stored in another computer readable storage devices, for example, on a hard disk drive, or in removable storage such as an optical disk (for eventual use in a CD ROM) or floppy disk (for eventual use in a floppy disk drive), or downloaded via the Internet or other computer network. Computer readable storage devices herein comprise all computer readable media, with the sole exception being a transitory, propagating signal. Further, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the known art of this invention. Furthermore, it is to be understood that the invention is solely defined by the appended claims. It will be understood by those with skill in the art, that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

Based on the foregoing, computer system, method and program product have been disclosed in accordance with the present invention. However, numerous modifications and substitutions can be made without deviating from the scope of the present invention. Therefore, the present invention has been disclosed by way of example and not limitation.

What is claimed is:

1. A method of routing task assignments to an assignee or to a delegate of the assignee, the method comprising the steps of:
    identifying, by a computer, a task assignment, wherein the task assignment does not require an assignee to be at a specified location to complete the task assignment;
    requesting, by the computer, an assignee availability from a mobile device of the assignee, wherein the assignee availability indicates whether an assignee is available to perform work on the task assignment;
    determining, by the mobile device of the assignee, the assignee availability, wherein the assignee availability is based at least in part on first information, the first information including
        an estimated amount of time required to complete a number of task assignments in a task assignment queue for a calendar date,
        a scheduled event in a calendar of the mobile device,
        a direction and velocity of the mobile device, the direction and velocity of the mobile device indicating whether the assignee is a) in transit and b) utilizing a form of transit that will allow the assignee to perform work on the task;
    the determining comprising comparing, by the mobile device, the first information to a sending criteria, the sending criteria comprising at least a velocity limit and a duration threshold,
    wherein exceeding the at least a velocity limit and a duration threshold indicates that the assignee is unavailable to perform work on the task, sending, by the mobile device and to the computer, the assignee availability;
    responsive to the assignee availability indicating that the assignee is available to perform work on the task assignment, sending, by the computer, a second information to the mobile device of the assignee; and
    responsive to the assignee availability indicating that the assignee is not available to perform work on the task assignment, sending, by the computer, the second information to a delegate of the assignee.

2. The method of claim 1, wherein the first information received by the computer includes at least one of a signal from the mobile device, a location of the mobile device, a time of day of the assignee according to the mobile device of the assignee, and a degree of connectivity of the mobile device with a communications network.

3. The method of claim 1, further comprising the step of:
    identifying by the computer the delegate of the assignee from a plurality of delegates based in part on the first information, a priority of a delegate, a signal from a mobile device of the delegate, a vector of the mobile device of the delegate, a location of the mobile device of the delegate, a calendar date, a scheduled events in the calendar of the mobile device of the delegate, a time of day of the delegate according to the mobile device of the delegate, a number of task assignments in a task assignment queue of the mobile device of the delegate, and a connectivity of the mobile device of the delegate for a period of time.

4. The method of claim 1, further comprising the step of:
    determining task assignment appropriateness for the assignee or the delegate of the assignee, by the computer, through comparison of a preferred characteristic set associated with the task assignment to a personal characteristic set of the assignee or the delegate of the assignee, wherein the personal characteristic set includes one or more of a skill set, a security clearance, a license, an authorization and authority, a date constraint, a time constraint, a task assignment queue and a personal task assignment preference.

5. The method of claim 1, wherein the step of receiving the first information includes receiving the first information when a change in availability of the delegate of the mobile device is determined by the mobile device.

6. The method of claim 1, further comprising the step of:
    updating, by the computer, a status of the assignee or the delegate of the assignee as not available if the first information is not timely received, by the computer, or if the mobile device of the assignee or the delegate of the assignee fails to timely respond to a signal.

7. The method of claim 1 further comprising the steps of:
    determining, by the computer, whether a task assignment can be completed within a period of time; and
    responsive to determining, by the computer, that a task assignment can not be completed within the period of time, sending by the computer the second information to the delegate of the assignee.

8. A computer system to route task assignments to an assignee or to a delegate of the assignee, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to identify a task assignment, wherein the task assignment does not require an assignee to be at a specified location to complete the task assignment;
program instructions to request an assignee availability from a mobile device of the assignee, wherein the assignee availability indicates whether an assignee is available to perform work on the task assignment;
program instructions to determine the assignee availability, wherein the assignee availability is based at least in part on first information, the first information including
an estimated amount of time required to complete a number of task assignments in a task assignment queue for a calendar date,
a scheduled event in a calendar of the mobile device,
a direction and velocity of the mobile device, the direction and velocity of the mobile device indicating whether the assignee is a) in transit and b) utilizing a form of transit that will allow the assignee to perform work on the task;
the determining comprising comparing, by the mobile device, the first information to a sending criteria, the sending criteria comprising at least a velocity limit and a duration threshold,
wherein exceeding the at least a velocity limit and a duration threshold indicates that the assignee is unavailable to perform work on the task, sending, by the mobile device and to the computer, the assignee availability;
program instructions to, responsive to the assignee availability indicating that the assignee is available to perform work on the task assignment, send a second information to the mobile device of the assignee; and
program instructions to, responsive to the assignee availability indicating that the assignee is not available to perform work on the task assignment, send the second information to a delegate of the assignee.

9. A computer system in accordance with claim 8, wherein the first information received by the computer includes at least one of a signal from the mobile device, a location of the mobile device, a time of day of the assignee according to the mobile device of the assignee, and a degree of connectivity of the mobile device with a communications network.

10. A computer system in accordance with claim 8, further comprising program instructions to identify by the computer the delegate of the assignee from a plurality of delegates based in part on the first information, a priority of a delegate, a signal from a mobile device of the delegate, a vector of the mobile device of the delegate, a location of the mobile device of the delegate, a calendar date, a scheduled events in the calendar of the mobile device of the delegate, a time of day of the delegate according to the mobile device of the delegate, a number of task assignments in a task assignment queue of the mobile device of the delegate, and a connectivity of the mobile device of the delegate for a period of time.

11. A computer system in accordance with claim 8, wherein receiving the first information includes receiving the first information when a change in availability of the delegate of the mobile device is determined by the mobile device.

12. A computer system in accordance with claim 8, further comprising program instructions to update a status of the assignee or the delegate of the assignee as not available if the first information is not timely received, by the computer, or if the mobile device of the assignee or the delegate of the assignee fails to timely respond to a signal.

13. A computer system in accordance with claim 8, further comprising program instructions to:
determine whether a task assignment can be completed within a period of time; and
responsive to determining that a task assignment can not be completed within the period of time, sending by the computer the second information to the delegate of the assignee.

14. A computer program product to route task assignments to an assignee or to a delegate of the assignee, the computer program product comprising:
one or more computer-readable storage devices and program instructions stored on at least one of the one or more tangible storage devices, the program instructions comprising:
program instructions to identify a task assignment, wherein the task assignment does not require an assignee to be at a specified location to complete the task assignment;
program instructions to request an assignee availability from a mobile device of the assignee, wherein the assignee availability indicates whether an assignee is available to perform work on the task assignment;
program instructions to determine the assignee availability, wherein the assignee availability is based at least in part on first information, the first information including
an estimated amount of time required to complete a number of task assignments in a task assignment queue for a calendar date,
a scheduled event in a calendar of the mobile device,
a direction and velocity of the mobile device, the direction and velocity of the mobile device indicating whether the assignee is a) in transit and b) utilizing a form of transit that will allow the assignee to perform work on the task;
the determining comprising comparing, by the mobile device, the first information to a sending criteria, the sending criteria comprising at least a velocity limit and a duration threshold,
wherein exceeding the at least a velocity limit and a duration threshold indicates that the assignee is unavailable to perform work on the task, sending, by the mobile device and to the computer, the assignee availability;
program instructions to, responsive to the assignee availability indicating that the assignee is available to perform work on the task assignment, send a second information to the mobile device of the assignee; and
program instructions to, responsive to the assignee availability indicating that the assignee is not available to perform work on the task assignment, send the second information to a delegate of the assignee.

15. The computer program product of claim 14, wherein the first information received by the computer includes at least one of a signal from the mobile device, a location of the mobile device, a time of day of the assignee according to the mobile device of the assignee, and a degree of connectivity of the mobile device with a communications network.

16. The computer program product of claim 14, further comprising program instructions to identify by the computer the delegate of the assignee from a plurality of delegates based in part on the first information, a priority of a delegate, a signal from a mobile device of the delegate, a vector of the mobile device of the delegate, a location of the mobile device of the delegate, a calendar date, a scheduled events in the calendar of the mobile device of the delegate, a time of day of the delegate according to the mobile device of the delegate, a number of task assignments in a task assignment queue of the mobile device of the delegate, and a connectivity of the mobile device of the delegate for a period of time.

17. The computer program product of claim 14, further comprising program instructions to determine task assignment appropriateness for the assignee or a delegate of the assignee, by the computer, through comparison of a preferred characteristic set associated with the task assignment to a personal characteristic set of the assignee or the delegate of the assignee, wherein the personal characteristic set includes one or more of a skill set, a security clearance, a license, an authorization and authority, a date constraint, a time constraint, a task assignment queue and a personal task assignment preference.

18. The computer program product of claim 14, wherein receiving the first information includes receiving the first information when a change in availability of the delegate of the mobile device is determined by the mobile device.

19. The computer program product of claim 14, further comprising program instructions to update a status of the assignee or a delegate of the assignee as not available if the first information is not timely received, by the computer, or if the mobile device of the assignee or a delegate of the assignee fails to timely respond to a signal.

20. The computer program product of claim 14, further comprising program instructions to:

determine whether a task assignment can be completed within a period of time; and responsive to determining that a task assignment can not be completed within the period of time, sending by the computer the second information to the delegate of the assignee.

* * * * *